T. M. PLATT.
HYDRAULIC STUFFING BOX.
APPLICATION FILED APR. 23, 1914.
1,124,514.
Patented Jan. 12, 1915.
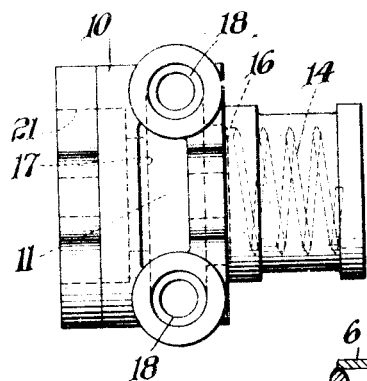
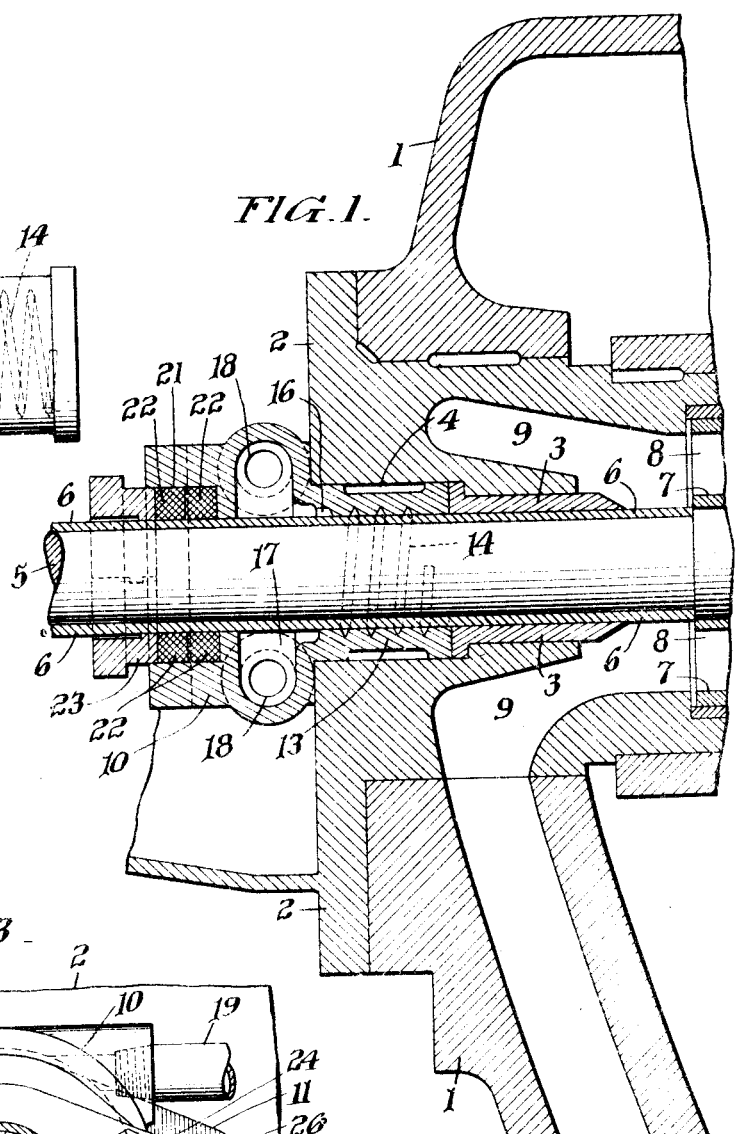
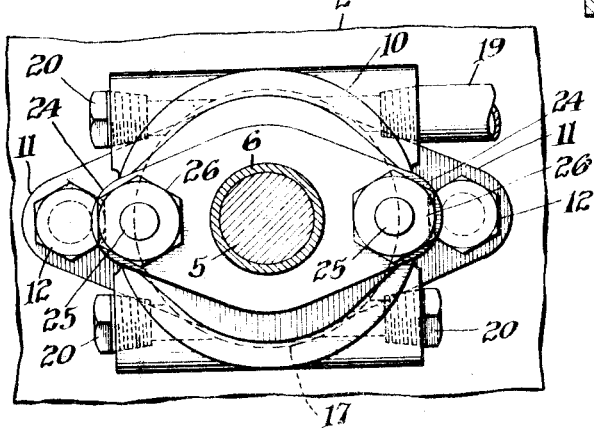
WITNESSES
Daniel Webster Jr.
William Conway
INVENTOR
Thomas M. Platt
BY Cornelius D. Ehret
his ATTORNEY

UNITED STATES PATENT OFFICE.

THOMAS M. PLATT, OF PHILADELPHIA, PENNSYLVANIA, ASSIGNOR TO C. H. WHEELER MANUFACTURING COMPANY, OF PHILADELPHIA, PENNSYLVANIA, A CORPORATION OF PENNSYLVANIA.

HYDRAULIC STUFFING-BOX.

1,124,514.  Specification of Letters Patent.  Patented Jan. 12, 1915.

Application filed April 23, 1914. Serial No. 833,863.

*To all whom it may concern:*

Be it known that I, THOMAS M. PLATT, a citizen of the United States, residing in the city of Philadelphia, county of Philadelphia, and State of Pennsylvania, have invented certain new and useful Improvements in Hydraulic Stuffing-Boxes, of which the following is a specification.

My invention relates to a hydraulic stuffing box or a stuffing box for prevention of leakage of gas or liquid along a rotary shaft or reciprocating rod extending through the wall of a chamber on opposite sides of which are masses of fluid under different pressures.

More particularly my invention resides in a stuffing box of the character above referred to by which leakage of air along the rotary shaft of a rotary or centrifugal pump to the interior of a pump is prevented.

My invention resides in a stuffing box of the character referred to in which a liquid or water seal is provided, the sealing means comprising a chamber or cavity subjected to liquid or water pressure, and a groove of any suitable shape and pitch is made in a member within which the shaft or shaft sleeve rotates.

My invention resides in a stuffing box of the character hereinafter described and claimed.

For an illustration of one of the forms my invention may take reference may be had to the accompanying drawing, in which:
Figure 1 is a vertical sectional view through the stuffing box and through the part of a chamber or casing through whose wall a rotary shaft, shown in elevation, extends. Fig. 2 is a side elevation of the stuffing box. Fig. 3 is an end elevational view of the same.

In Fig. 1 a casing 1 of a centrifugal pump, rotary entrainment pump, or similar apparatus, is shown in section, it being understood however that my invention is not limited to use in connection with such apparatus. In the pump head 2, secured to the casing 1, is a stuffing box bushing 3 disposed at the inner end of the bore 4 in the head 2. The rotary shaft 5 is here shown as provided with a wearing sleeve 6, though it is to be understood that my invention is applicable to cases where such a wearing sleeve is omitted. Secured upon the shaft 5 is the impeller or other driven member 7 whose eye or suction openings 8 communicate with the space 9 normally filled with water drawn into the suction openings 8 of the impeller when the latter is in operation. The stuffing box 10 has lugs 11 through which extend bolts 12 engaging in the wall or head 2 and holding the stuffing box in place, the extension 13 on the stuffing box extending into the bore 4 in head 2. The extension 13 has a bore within which the sleeve 6 has a running fit, and in the bearing surface or inner wall of such extension is a helical groove 14, the cross section of the groove being shown as V shaped though any other suitable shape may be employed. One end of the groove 14 communicates with the short groove 16 communicating with the chamber or hollow space 17 within the stuffing box, such chamber being annular and surrounding the shaft. Communicating with the chamber 17 is a plurality of holes 18 tapped to receive a pipe, as 19, connecting with any suitable water or other liquid supply under pressure, such as a city water main or, where the stuffing box is applied to a centrifugal pump, to the discharge connection of that pump. The plurality of holes 18 is provided so that the pipe connection may be made with that hole which is most convenient for the purpose and then the other holes may be plugged up by screw-threaded plugs 20.

Within the cylindrical recess 21 in the stuffing box 10 may be placed packing 22 compressed by the gland 23 having the lugs 24 through which extend screw threaded studs 25 threaded into the stuffing box 10, nuts 26 serving to force the gland to the right, as viewed in Fig. 1, to compress the packing in a manner well understood.

In operation, water or liquid under pressure is delivered by pipe 19 into the chamber 17, filling the same with water or liquid under pressure. Leakage of this liquid or water toward the left, Fig. 1, from chamber 17 along the sleeve 6 is prevented by the packing 22 and gland 23. Assuming that there is a suction pressure or pressure below atmospheric in the space 9, there would be a tendency for air to leak along the sleeve 6 into the space 9. This is prevented by the sealing water in chamber 17 which water passes into the groove 14. And with a given direction of rotation of the shaft 5 the pitch of the groove 14 is preferably in such direction as to oppose but not completely prevent passage of a film of liquid or water longitudinally of the sleeve 6 toward the right in Fig. 1. Thus liquid or water passes very slowly or in slight quantity from the chamber 17 into the space 9, this sealing liquid or water preventing the entry of air which would otherwise interfere with the maintenance of proper pressure or operation within the pump or chamber 9.

Obviously the same structure may be used to prevent leakage in the case where the pressure inside of the pump or other chamber is higher than the pressure outside of the same, in which case the pitch of the groove 14 would preferably be reversed for the same given direction of rotation of shaft.

What I claim is:

1. The combination with a shaft, of a stuffing box having a chamber containing fluid under pressure, and a part having a running fit with said shaft and having a helical groove communicating with said chamber.

2. The combination with a shaft, of a stuffing box having an annular chamber containing fluid under pressure, and a part in which said shaft has a running fit, said part having a helical groove communicating with said chamber and extending around said shaft in the bearing surface of said part.

3. The combination with a shaft, of a stuffing box having an annular chamber containing fluid under pressure, and a part in which said shaft has a running fit, said part having a groove communicating with said chamber and extending around and longitudinally of said shaft in the bearing surface of said part.

4. The combination with a shaft, of a stuffing box having a chamber containing fluid under pressure, a part in which said shaft has a running fit, said part having a helical groove in the bearing surface of said part and communicating with said chamber, said shaft rotating in such direction and said groove pitched in such direction that flow of fluid from said chamber through said groove is opposed.

5. The combination with a shaft, of a stuffing box having a chamber containing fluid under pressure, a part on one side of said chamber in which said shaft has a running fit, said part having a groove communicating with said chamber and extending around said shaft, and a fluid packing between said shaft and said stuffing box on the other side of said chamber.

6. The combination with a shaft, of a stuffing box having a chamber containing fluid under pressure, a part in which said shaft has a running fit, the bearing surface between said shaft and said part having a helical groove communicating at its one end with said chamber, said shaft rotating in such direction and said groove pitched in such direction as to coöperate with the fluid pressure to prevent leakage of another material along said shaft.

7. The combination with a shaft, of a stuffing box having a chamber containing fluid under pressure, a part on one side of said chamber in which said shaft has a running fit, the bearing surface between said shaft and said part having a helical groove communicating with said chamber, a packing surrounding said shaft on the other side of said chamber, and a gland for compressing said packing between said stuffing box and said shaft.

8. A stuffing box comprising a member having a chamber containing fluid under pressure, a lateral projection on said member having a bore adapted to make a running fit with a shaft, a helical groove in said bore communicating with said chamber, a second projection on said member having a packing receiving bore, and a gland extending into said bore.

9. The combination with a wall, of a stuffing box comprising a member having a chamber, said member disposed outside of said wall, a lateral projection on said member extending into a bore of said wall, said projection having a bore adapted to make a running fit with a shaft extending through said wall, and a helical groove in the bearing face of said extension communicating with said chamber.

10. The combination with a wall having a bore and a counterbore, of a sleeve in said bore having a shoulder in said counterbore, a member outside of said wall having a chamber, a lateral extension on said member disposed in said counterbore and adapted to have a running fit with a shaft extending through said wall, and a helical groove communicating with said chamber.

In testimony whereof I have hereunto affixed my signature in the presence of the two subscribing witnesses, April 21, 1914.

THOMAS M. PLATT.

Witnesses:
NELLIE FIELD,
N. B. EVANS.